United States Patent
Chang et al.

(10) Patent No.: US 11,188,380 B2
(45) Date of Patent: Nov. 30, 2021

(54) METHOD AND APPARATUS FOR PROCESSING TASK IN SMART DEVICE

(71) Applicant: BAIDU ONLINE NETWORK TECHNOLOGY (BEIJING) CO., LTD., Beijing (CN)

(72) Inventors: Xiantang Chang, Beijing (CN); Qian Shen, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 44 days.

(21) Appl. No.: 16/134,903

(22) Filed: Sep. 18, 2018

(65) Prior Publication Data
US 2019/0163524 A1    May 30, 2019

(30) Foreign Application Priority Data
Nov. 30, 2017   (CN) .......................... 201711242775.X (51) Int. Cl.
   *G06F 9/48*    (2006.01)
   *G06F 9/50*    (2006.01)

(52) U.S. Cl.
   CPC .......... *G06F 9/4881* (2013.01); *G06F 9/5027* (2013.01)

(58) Field of Classification Search
   CPC ..... G06F 2209/5011; G06F 2209/5018; G06F 9/4881; G06F 2209/548; G06F 9/4806; G06F 9/5027
   See application file for complete search history.

(56) References Cited

U.S. PATENT DOCUMENTS

| | | | |
|---|---|---|---|
| 6,182,109 B1 | 1/2001 | Sharma et al. | |
| 9,569,255 B1* | 2/2017 | Johnson | G06F 9/4806 |
| 2005/0179936 A1 | 8/2005 | Sedky et al. | |
| 2006/0143608 A1* | 6/2006 | Dostert | G06F 9/5027 718/1 |
| 2009/0019439 A1* | 1/2009 | Kwon | G06F 9/5027 718/100 |
| 2012/0284725 A1 | 11/2012 | Zwaal | |

(Continued)

FOREIGN PATENT DOCUMENTS

| | | |
|---|---|---|
| CN | 102891779 A | 1/2013 |
| CN | 102930427 A | 2/2013 |

(Continued)

OTHER PUBLICATIONS

Office Action, Japanese Application No. 2018-174147, dated Aug. 31, 2021.

*Primary Examiner* — Dong U Kim
(74) *Attorney, Agent, or Firm* — Marshall, Gerstein & Borun LLP (57) ABSTRACT

A method and apparatus for processing a task in a smart device are provided. A specific embodiment of the method includes: receiving service information sent by a server, the service information comprising task description information in a predetermined data format; analyzing the service information based on the predetermined data format to determine a to-be-processed task; arranging the to-be-processed task into a to-be-processed task queue; and processing a plurality of the to-be-processed tasks in the to-be-processed task queue. The embodiment improves the processing efficiency of to-be-processed tasks.

14 Claims, 6 Drawing Sheets

(56) References Cited

U.S. PATENT DOCUMENTS

| | | | |
|---|---|---|---|
| 2012/0309363 A1 | 12/2012 | Gruber et al. | |
| 2013/0066891 A1* | 3/2013 | Boldyrev | G06F 16/48 707/755 |
| 2015/0339168 A1* | 11/2015 | Mason | G06F 9/5027 718/104 |
| 2019/0188034 A1* | 6/2019 | Lloyd | G06F 9/5027 |

FOREIGN PATENT DOCUMENTS

| | | |
|---|---|---|
| CN | 105608940 A | 5/2016 |
| CN | 105847179 A | 8/2016 |
| CN | 107305548 A | 10/2017 |
| JP | H9265409 A | 10/1997 |
| JP | 2005276175 A | 10/2005 |
| JP | 2011065645 A | 3/2011 |

* cited by examiner

METHOD AND APPARATUS FOR PROCESSING TASK IN SMART DEVICE

CROSS-REFERENCE TO RELATED APPLICATIONS

This application claims priority to Chinese Patent Application no. 201711242775.X, filed with the China National Intellectual Property Administration (CNIPA) on Nov. 30, 2017, the contents of which are incorporated herein by reference in their entirety.

TECHNICAL FIELD

Embodiments of the disclosure relate to the field of computer technology, specifically to the field of Internet technology, and more specifically to a method and apparatus for processing a task in a smart device.

BACKGROUND

With the development of artificial intelligence, smart devices can acquire a user's voice input, upload the user's voice input to a server, receive an instruction returned from the server, and execute an appropriate operation, for example, device control, information query, and schedule management, thereby realizing interaction between the user and a mobile device through a natural language dialogue.

SUMMARY

Embodiments of the disclosure provide a method and apparatus for processing a task in a smart device.

In a first aspect, an embodiment of the disclosure provides a method for processing a task in a smart device. The method includes: receiving service information sent by a server, the service information including task description information in a predetermined data format; analyzing the service information based on the predetermined data format to determine a to-be-processed task; arranging the to-be-processed task into a to-be-processed task queue; and processing a plurality of the to-be-processed tasks in the to-be-processed task queue.

In some embodiments, the to-be-processed task queue is a concurrent task queue, and the processing a plurality of the to-be-processed tasks in the to-be-processed task queue includes: adding, in response to the to-be-processed task queue being unempty and an idle thread existing in a first thread pool, at least a part of the to-be-processed tasks in the to-be-processed task queue to the first thread pool, wherein a number of the to-be-processed tasks in the at least a part of the to-be-processed tasks is less than or equal to a number of the idle threads in the first thread pool; and removing the at least apart of the to-be-processed tasks from the to-be-processed task queue after completing executing the at least a part of the to-be-processed tasks.

In some embodiments, the to-be-processed task queue is a serial task queue, and the processing a plurality of the to-be-processed tasks in the to-be-processed task queue includes: using, in response to an absence of the to-be-processed tasks being executed and the serial task queue being unempty, the to-be-processed task at the head of the serial task queue as a first task and executing following serial processing: executing the first task, and removing the first task from the serial task queue after completing the executing the first task; and using, in response to the serial task queue being unempty, the current to-be-processed task at the head of the serial task queue as the first task, and continuing executing the serial processing.

In some embodiments, the service information is generated by the server based on event information received from the smart device, and the event information includes at least one of following items: voice input information of the smart device, or state change information of the smart device when executing the to-be-processed tasks.

In some embodiments, the event information is sent to the server by following: generating a to-be-uploaded event based on the event information; arranging the to-be-uploaded event into a to-be-uploaded event queue; and sending a plurality of the to-be-uploaded events in the to-be-uploaded event queue to the server in a predetermined data format.

In some embodiments, the sending a plurality of the to-be-uploaded events in the to-be-uploaded event queue to the server in the predetermined data format includes: adding, in response to the to-be-uploaded event queue being unempty and an idle thread existing in a second thread pool, at least a part of the to-be-uploaded events in the to-be-uploaded event queue to the second thread pool, wherein a number of the to-be-uploaded events in the at least a part of the to-be-uploaded events is less than or equal to a number of idle threads in the second thread pool; and removing the at least a part of the to-be-uploaded events from the to-be-uploaded event queue after completing executing the at least a part of the to-be-uploaded events.

In some embodiments, a reusable communication link exists between the smart device and the server.

In a second aspect, an embodiment of the disclosure provides an apparatus for processing a task in a smart device. The apparatus includes: a receiving unit, configured for receiving service information sent by a server, the service information including task description information in a predetermined data format; an analysis unit, configured for analyzing the service information based on the predetermined data format to determine a to-be-processed task; a distribution unit, for arranging the to-be-processed task into a to-be-processed task queue; and a processing unit, configured for processing a plurality of the to-be-processed tasks in the to-be-processed task queue.

In some embodiments, the to-be-processed task queue is a concurrent task queue, and the processing unit includes: a concurrent execution module, configured for adding, in response to the to-be-processed task queue being unempty and an idle thread existing in a first thread pool, at least a part of the to-be-processed tasks in the to-be-processed task queue to the first thread pool, wherein a number of the to-be-processed tasks in the at least a part of the to-be-processed tasks is less than or equal to a number of the idle threads in the first thread pool; and a concurrent removal module, configured for removing the at least a part of the to-be-processed tasks from the to-be-processed task queue after completing executing the at least a part of the to-be-processed tasks.

In some embodiments, the to-be-processed task queue is a serial task queue, and the processing unit includes: a first serial execution module, configured for using, in response to an absence of the to-be-processed tasks being executed and the serial task queue being unempty, the to-be-processed task at the head of the serial task queue as a first task and executing following serial processing: executing the first task, and removing the first task from the serial task queue after completing the executing the first task; and a second serial execution module, configured for using, in response to the serial task queue being unempty, the current to-beprocessed task at the head of the serial task queue as the first task, and continuing executing the serial processing.

In some embodiments, the service information is generated by the server based on event information received from the smart device, and the event information includes at least one of following items: voice input information of the smart device, or state change information of the smart device when executing the to-be-processed tasks.

In some embodiments, the apparatus further includes an event unit, configured for sending the event information to the server.

In some embodiments, the event unit includes: an event generation module, configured for generating a to-be-uploaded event based on the event information; an event distribution module, configured for arranging the to-be-uploaded event into a to-be-uploaded event queue; and an uploading module, configured for sending a plurality of the to-be-uploaded events in the to-be-uploaded event queue to the server in a predetermined data format.

In some embodiments, the uploading module includes: an execution submodule, configured for adding, in response to the to-be-uploaded event queue being unempty and an idle thread existing in a second thread pool, at least a part of the to-be-uploaded events in the to-be-uploaded event queue to the second thread pool, wherein a number of the to-be-uploaded events in the at least a part of the to-be-uploaded events is less than or equal to a number of idle threads in the second thread pool; and a removal submodule, configured for removing the at least a part of the to-be-uploaded events from the to-be-uploaded event queue after completing executing the at least a part of the to-be-uploaded events.

In some embodiments, a reusable communication link exists between the smart device and the server.

The method and apparatus for processing a task in a smart device provided by the embodiments of the disclosure receive service information including task description information, then arrange to-be-processed tasks into a to-be-processed task queue, and finally process the to-be-processed tasks in the to-be-processed task queue, thereby improving the processing efficiency of to-be-processed tasks.

BRIEF DESCRIPTION OF THE DRAWINGS

By reading and referring to detailed description on the non-limiting embodiments in the following accompanying drawings, other features, objects and advantages of the disclosure will become more apparent.

DETAILED DESCRIPTION OF EMBODIMENTS

The present application will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
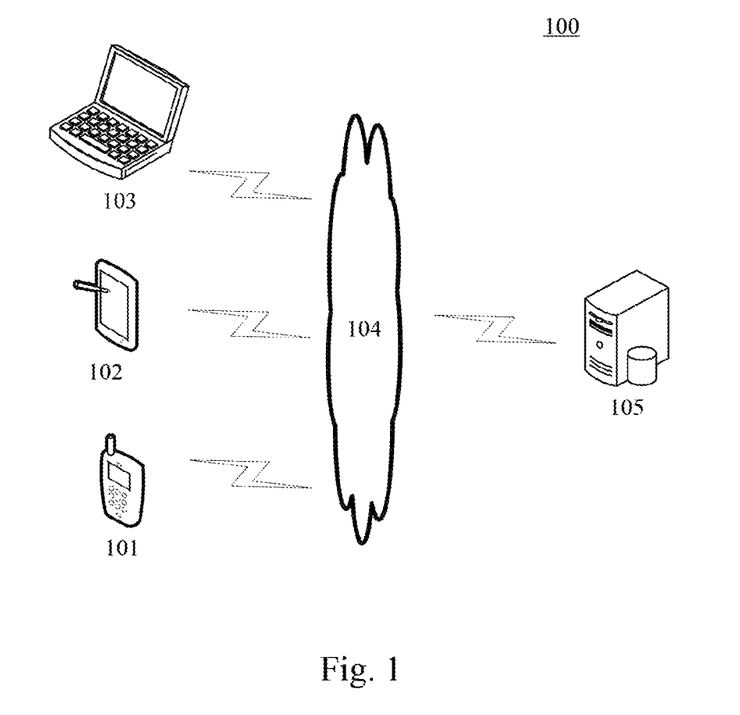
FIG. 1 is a structural diagram of an illustrative system in which the disclosure may be applied.

FIG. 1 shows an illustrative architecture of a system 100 which may be used by a method for processing a task in a smart device or an apparatus for processing a task in a smart device according to the embodiments of the present disclosure.

As shown in FIG. 1, the system architecture 100 may include terminal devices 101, 102, and 103, a network 104, and a server 105. The network 104 serves as a medium providing a communication link between the terminal devices 101, 102, and 103, and the server 105. The network 104 may include various types of connections, such as wired or wireless transmission links, or optical fibers.

The user may use the terminal device 101, 102, or 103 to interact with the server 105 through the network 104, in order to transmit or receive messages, etc. Various communication client applications, such as voice input applications, shopping applications, search applications, instant messaging tools, mailbox clients, and social platform software may be installed on the terminal devices 101, 102, and 103.

The terminal devices 101, 102, and 103 may be various electronic devices capable of interacting with the server, including but not limited to, portable devices, such as smart phones, watchs, bracelet; and smart appliances, such as televisions, bridges, air conditioner, water heaters, and washing machines.

The server 105 may be a server providing various services, for example, a server providing support for the conversational mode interaction of the terminal devices 101, 102, and 103. The server 105 may analyze data such as the received voice input, and return instructions to the terminal devices 101, 102, and 103 based on the analysis result.

It should be noted that the method for processing a task in a smart device according to the embodiments of the present application is generally executed by the terminal devices 101, 102, and 103. Accordingly, an apparatus for processing a task in a smart device is generally installed on the terminal devices 101, 102, and 103.

It should be appreciated that the numbers of the terminal devices, the networks and the servers in FIG. 1 are merely illustrative. Any number of terminal devices, networks, and servers may be provided based on the actual requirements.

Figure 2:
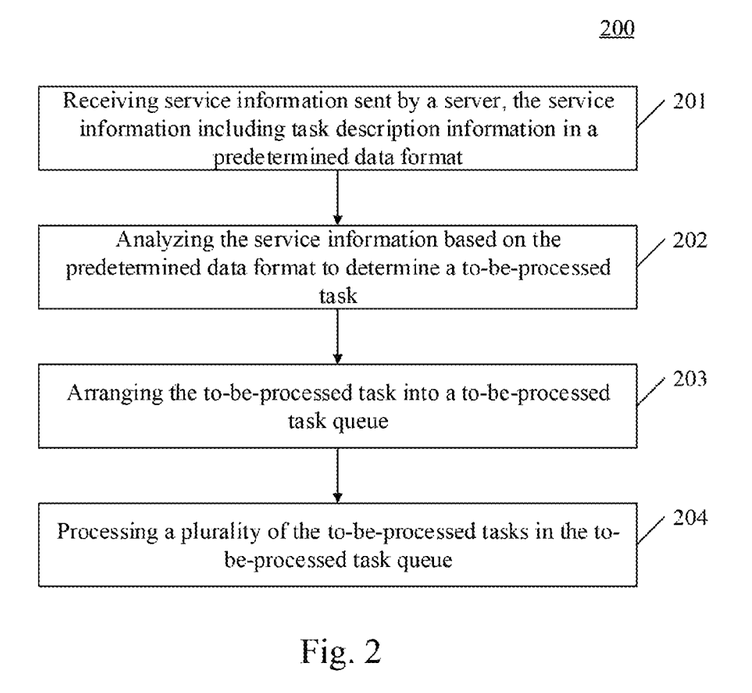
FIG. 2 is a process diagram of an embodiment of a method for processing a task in a smart device according to the disclosure.

Further referring to FIG. 2, a process 200 of an embodiment of a method for processing a task in a smart device according to the disclosure is shown. The method for processing a task in a smart device includes:

Step 201: receiving service information sent by a server, the service information including task description information in a predetermined data format.

In the embodiment, a smart device (e.g., the terminal device shown in FIG. 1) on which the method for processing a task in a smart device runs may receive service information from a server via wired connection or wireless connection, wherein the service information includes task description information in a predetermined format.

Usually, the smart device receives the service information based on the HTTP (hypertext transfer protocol) 2.0. The task description information may be text information in a JSON (javaScript object notation, a lightweight data exchange format) format.

It should be appreciated that the service information may include additional information in addition to the task description information. For example, when a to-be-processed task to be described hereinafter is a voice related operation such as music playing, the service information may further include voice information in binary stream format.

step 202: analyzing the service information based on the predetermined data format to determine a to-be-processed task.

In the embodiment, the mobile device (e.g., the terminal devices shown in FIG. 1) may analyze the service information obtained in the step 201 based on the predetermined data format (e.g., JSON format) to obtain analyzed task description information, and generate a to-be-processed task based on the analyzed task description information.

Taking the service information including the task description information in the JSON format as an example, a task attribute and an attribute value (existing in a JSON text in a form of a key-value pair) in the task description information may be acquired first, and then the acquired task attribute and attribute value may be encapsulated to a to-be-processed task (for example, in object-oriented programming, the to-be-processed task may be a specific example of task class).

step 203: arranging the to-be-processed task into a to-be-processed task queue.

In the embodiment, the smart device on which the method for processing a task in a smart device runs may pre-establish at least one to-be-processed task queue, and then arrange the to-be-processed task determined in the step 202 into the to-be-processed task queue. For example, the to-be-processed tasks are arranged into the to-be-processed task queue based on the generation time of the to-be-processed tasks, e.g., arranging the latest generated to-be-processed task into the rear of the to-be-processed task queue; or the to-be-processed tasks are arranged into the to-be-processed task queue based on the priorities of the to-be-processed tasks, e.g., arranging the to-be-processed task of low priority into the rear of the to-be-processed task queue. Here, the to-be-processed task queue may be stored in the smart device, such as the local memory of the smart device or a removable storage medium.

step 204: processing a plurality of the to-be-processed tasks in the to-be-processed task queue.

In the embodiment, the mobile device may process a plurality of the to-be-processed tasks in the to-be-processed task queue based on the type (for example, a concurrent task queue or a serial task queue) of the to-be-processed task queue and the attributes (for example, generation time or priority) of the to-be-processed tasks in the to-be-processed task queue.

In some optional implementations of the embodiment, the to-be-processed task queue is a concurrent task queue, and the processing a plurality of the to-be-processed tasks in the to-be-processed task queue includes: adding, in response to the to-be-processed task queue being unempty and an idle thread existing in a first thread pool, at least a part of the to-be-processed tasks in the to-be-processed task queue to the first thread pool, wherein a number of the to-be-processed tasks in the at least a part of the to-be-processed tasks is less than or equal to a number of the idle threads in the first thread pool; and removing the at least a part of the to-be-processed tasks from the to-be-processed task queue after completing executing the at least a part of the to-be-processed tasks.

Specifically, the smart device may be provided with the first thread pool having a predetermined number of threads, e.g., provided with the first thread pool having four threads. The smart device will regularly check states of the to-be-processed task queue and the first thread pool. When the to-be-processed task queue is unempty (that is, at least one to-be-processed task exists) and an idle thread (all threads or a part of the threads are idle) exists in the first thread pool, at least a part of the to-be-processed tasks are taken from the to-be-processed task queue to add to the first thread pool. The execution of the to-be-processed tasks is controlled by a first thread pool manager. Here, the number of the at least a part of the to-be-processed tasks is less than or equal to the number of idle threads in the first thread pool. For example, when four idle threads exist, one to four to-be-processed tasks may be added to the first thread pool; while when two idle threads exist, one or two to-be-processed tasks may be added to the first thread pool.

For each of the to-be-processed tasks added to the first thread pool, after completing the executing the each to-be-processed task, the each to-be-processed task is removed from the to-be-processed task queue.

The first thread pool is set for concurrently processing a plurality of the to-be-processed tasks in the to-be-processed task queue, thereby improving the processing efficiency of the to-be-processed tasks, whilst avoiding bringing high pressure on running of the smart device because of simultaneously executing too many to-be-processed tasks.

Furthermore, because the threads in the first thread pool occupy a specific amount of system resources, the number of the threads in the first thread pool may be dynamically adjusted based on the number of the to-be-processed tasks in the to-be-processed task queue and the idle duration of the threads. For example, when the number of the to-be-processed tasks in the to-be-processed task queue is greater than a task number threshold, the number of the threads in the first thread pool may be increased to improve the processing efficiency of the to-be-processed tasks, while when idle duration of a thread is longer than a duration threshold, the thread having the idle duration longer than the duration threshold may be destroyed to save the system overhead.

In some optional implementations of the embodiment, the to-be-processed task queue is a serial task queue, and the processing a plurality of the to-be-processed tasks in the to-be-processed task queue includes: using, in response to an absence of the to-be-processed tasks being executed and the serial task queue being unempty, the to-be-processed task at the head of the serial task queue as a first task, and executing following serial processing: executing the first task, and removing the first task from the serial task queue after completing the executing the first task; and using, in response to the serial task queue being unempty, the current to-be-processed task at the head of the serial task queue as the first task, and continuing executing the serial processing.

Specifically, when the to-be-processed task queue is a serial task queue (that is, the to-be-processed tasks are executed in serial mode), and when the to-be-processed task queue is unempty and none of the to-be-processed tasks is being executed currently, the to-be-processed task at the head of the serial task queue is processed as the first task based on sequencing of the to-be-processed tasks in the to-be-processed task queue, and the first task is removed from the serial task queue after completing the executing the first task. If the serial task queue after the removing the first task is unempty, then executing the current to-be-processed task at the head of the serial task queue is continued, and so on.

Figure 3:
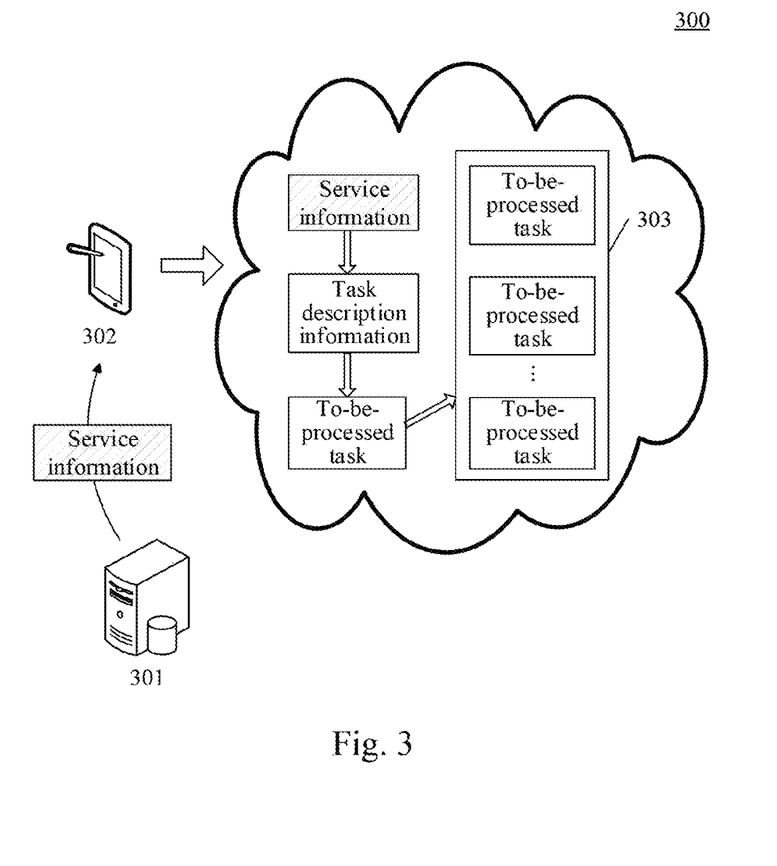
FIG. 3 is a schematic diagram of an application scenario of a method for processing a task in a smart device according to the disclosure.

Further referring to FIG. 3, a schematic diagram of an application scenario 300 of a method for processing a task in a smart device according to the embodiment is shown. In the application scenario 300 in FIG. 3, a smart device 302 first receives service information from a server 301. Then the smart device 302 analyzes the task description information in a predetermined format in the service information to determine a to-be-processed task, then arranges the determined to-be-processed task into a to-be-processed task queue 303 (e.g., a rear of the to-be-processed task queue 303), and finally processes a plurality of the to-be-processed tasks in the to-be-processed task queue 303.

The method for processing a task in a smart device provided by the embodiments of the disclosure arranges to-be-processed tasks into a to-be-processed task queue for processing, thereby improving the processing efficiency of the to-be-processed tasks.

Figure 4:
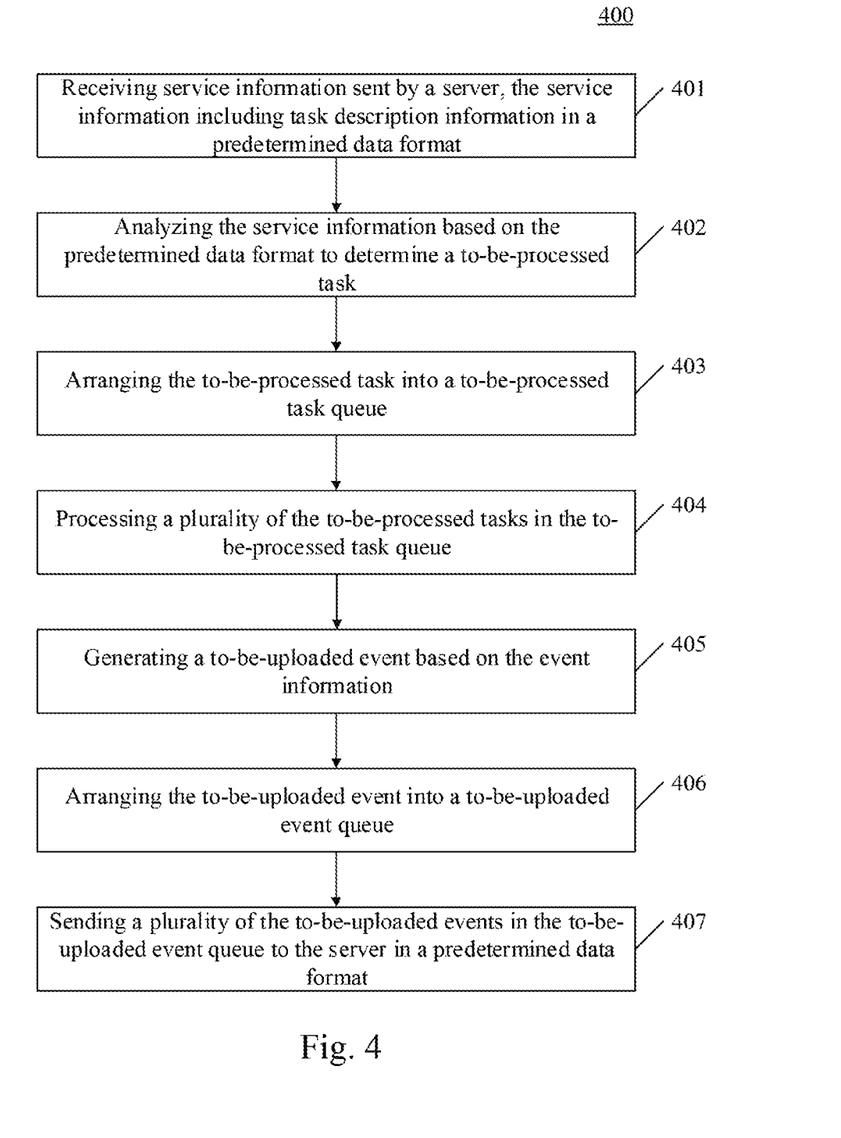
FIG. 4 is a process diagram of another embodiment of a method for processing a task in a smart device according to the disclosure.

Further referring to FIG. 4, a process 400 of another embodiment of a method for processing a task in a smart device is shown. The process 400 of the method for processing a task in a smart device includes:

step 401: receiving service information sent by a server, the service information including task description information in a predetermined data format.

In the embodiment, a smart device (e.g., the terminal devices shown in FIG. 1) on which the method for processing a task in a smart device runs may receive service information from a server via wired connection or wireless connection, wherein the service information includes task description information in a predetermined format.

step 402: analyzing the service information based on the predetermined data format to determine a to-be-processed task.

In the embodiment, the mobile device (e.g., the terminal devices shown in FIG. 1) may analyze the service information obtained in the step 401 based on the predetermined data format (e.g., JSON format) to obtain analyzed task description information, and generate a to-be-processed task based on the analyzed task description information.

step 403: arranging the to-be-processed task into a to-be-processed task queue.

In the embodiment, the smart device on which the method for processing a task in a smart device runs may pre-establish at least one to-be-processed task queue, and then arrange the to-be-processed task determined in the step 402 into the to-be-processed task queue.

step 404: processing a plurality of the to-be-processed tasks in the to-be-processed task queue.

In the embodiment, the mobile device may process a plurality of the to-be-processed tasks in the to-be-processed task queue based on the type (for example, a concurrent to-be-processed task queue or a serial to-be-processed task queue) of the to-be-processed task queue and the attributes (for example, generation time or priority) of the to-be-processed tasks in the to-be-processed task queue.

Compared with the embodiment shown in FIG. 2, in the embodiment, the service information is generated by the server based on event information received from the smart device, and the event information includes at least one of the following: voice input information of the smart device, or state change information of the smart device when executing the to-be-processed tasks.

Therefore, the process 400 of the method for processing a task in a smart device may further include:

step 405: generating a to-be-uploaded event based on the event information.

In the embodiment, the smart device can generate corresponding event information when receiving a user's voice input, or generate event information when executing a to-be-processed task (for example, at the time of starting to play music when the to-be-processed task is music playing). In this case, the generated event information may be encapsulated to generate a to-be-uploaded event (for example, in object-oriented programming, the to-be-uploaded events may be a specific example of event class) for subsequent processing.

step 406: arranging the to-be-uploaded event into a to-be-uploaded event queue.

In the embodiment, the smart device on which the method for processing a task in a smart device runs may pre-establish at least one to-be-uploaded event queue, and then arrange the to-be-uploaded event generated in the step 405 into the to-be-uploaded event queue. For example, the to-be-uploaded events are arranged into a to-be-uploaded event queue based on the generation time of the to-be-uploaded events, e.g., arranging the latest generated to-be-uploaded event into the rear of the to-be-processed task queue; or the to-be-uploaded events are arranged into a to-be-uploaded event queue based on the priorities of the to-be-uploaded events, e.g., arranging the to-be-uploaded event of low priority into the rear of the to-be-uploaded event queue. Here, the to-be-uploaded event queue may be stored in the smart device, such as the local memory of the smart device or a removable storage medium.

step 407: sending a plurality of the to-be-uploaded events in the to-be-uploaded event queue to the server in a predetermined data format.

In the embodiment, the mobile device may upload the to-be-uploaded events in the to-be-uploaded event queue to the server in a predetermined data format (e.g., a JSON format) based on the type (for example, a concurrent event queue or a serial event queue) of the to-be-uploaded event queue and the attributes (for example, generation time or priority) of the to-be-uploaded events in the to-be-uploaded event queue.

In some optional implementations of the embodiment, the sending a plurality of the to-be-uploaded events in the to-be-uploaded event queue to the server in the predetermined data format includes: adding, in response to the to-be-uploaded event queue being unempty and an idle thread existing in a second thread pool, at least a part of the to-be-uploaded events in the to-be-uploaded event queue to the second thread pool, wherein a number of the to-be-uploaded events in the at least a part of the to-be-uploaded events is less than or equal to a number of idle threads in the second thread pool; and removing the at least a part of the to-be-uploaded events from the to-be-uploaded event queue after completing executing the at least a part of the to-be-uploaded events.

Specifically, the smart device may be provided with the second thread pool having a predetermined number of threads, e.g., provided with the second thread pool having two threads. The smart device will regularly check states of the to-be-uploaded event queue and the second thread pool. When the to-be-uploaded event queue is unempty (that is, at least one to-be-uploaded event exists) and an idle thread (all threads or a part of threads are idle) exists in the second thread pool, at least a part of the to-be-uploaded events are taken from the to-be-uploaded event queue to add to the second thread pool. The execution of the to-be-uploaded events is controlled by a second thread pool manager. Here, the number of the at least a part of the to-be-uploaded events is less than or equal to the number of idle threads in the second thread pool. For example, when two idle threads exist, one or two to-be-uploaded events may be added to the second thread pool; while when one idle thread exists, at most one to-be-uploaded event may be added to the second thread pool.

As will be appreciated, the number of the threads in the second thread pool may be one, and when the second thread pool includes only one thread pool, the to-be-uploaded events are substantially uploaded in serial mode, that is, after one to-be-uploaded event is uploaded, the next to-be-uploaded event is further uploaded.

For each of the to-be-uploaded events added to the second thread pool, after completing the uploading the each to-be-uploaded event, the each to-be-uploaded event is removed from the to-be-uploaded event queue.

The second thread pool is set for concurrently uploading the to-be-uploaded events in the to-be-uploaded event queue, thereby improving the uploading efficiency of the to-be-uploaded events, whilst avoiding bringing high pressure on the running of the smart device because of simultaneously uploading too many to-be-uploaded events.

Furthermore, because the threads in the second thread pool occupy a specific amount of system resources, the number of the threads in the second thread pool may be dynamically adjusted based on the number of the to-be-uploaded events in the to-be-uploaded event queue and the idle duration of the threads. For example, when the number of the to-be-uploaded events in the to-be-uploaded event queue is greater than an event number threshold, the number of the threads in the second thread pool may be increased to improve the uploading efficiency of the to-be-uploaded events, while when idle duration of a thread is longer than a duration threshold, the thread having the idle duration longer than the duration threshold may be destroyed to save the system overhead.

In some optional implementations of the embodiment, a reusable communication link exists between the smart device and the server. For example, the communication link is established using the HTTP 2.0. A reusable communication link is set between the smart device and the server to avoid establishing a communication link during data transmission each time, thus improving the data transmission efficiency, for example, faster and more efficiently receiving the service information, uploading the to-be-uploaded events.

As can be seen from FIG. 4, compared with the embodiment corresponding to FIG. 2, the process 400 of a method for processing a task in a smart device according to the embodiment highlights the uploading the to-be-uploaded events. As a result, the solution according to the embodiment can upload the to-be-uploaded events in the to-be-uploaded event queue, thereby improving the uploading efficiency of the to-be-uploaded events.

Figure 5:
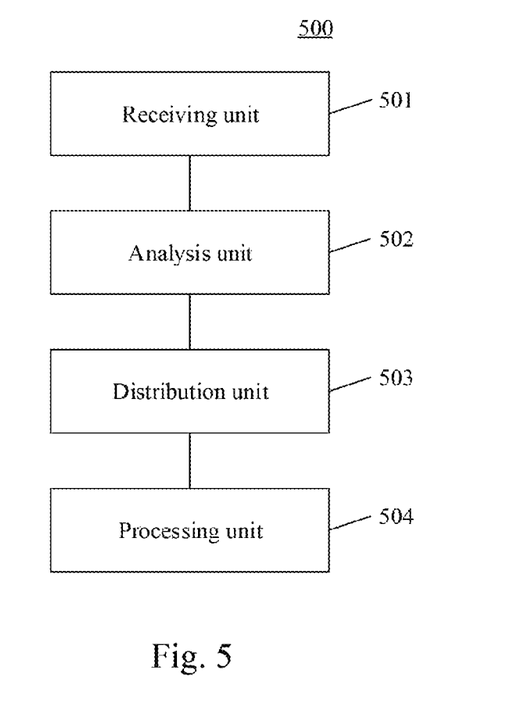
FIG. 5 is a structural schematic diagram of an embodiment of an apparatus for processing a task in a smart device according to the disclosure.

Further referring to FIG. 5, as an implementation of the method shown in the previous figures, the disclosure provides an embodiment of an apparatus for processing a task in a smart device. The embodiment of the apparatus corresponds to the embodiment of the method shown in FIG. 2, and the apparatus may be specifically applied to a variety of smart devices.

As shown in FIG. 5, an apparatus 500 for processing a task in a smart device according to the embodiment includes: a receiving unit 501, an analysis unit 502, a distribution unit 503, and a processing unit 504. The receiving unit 501 is configured for receiving service information sent by a server, the service information including task description information in a predetermined data format; the analysis unit 502 is configured for analyzing the service information based on the predetermined data format to determine a to-be-processed task; the distribution unit 503 is configured for arranging the to-be-processed task into a to-be-processed task queue; and the processing unit 504 is configured for processing a plurality of the to-be-processed tasks in the to-be-processed task queue.

In the embodiment, the receiving unit 501 of the apparatus 500 for processing a task in a smart device may receive service information from the server via wired connection or wireless connection, where the service information includes task description information in a predetermined format.

In the embodiment, the analysis unit 502 may analyze the service information received by the receiving unit 501 based on the predetermined data format (e.g., JSON format) to obtain analyzed task description information, and generate a to-be-processed task based on the analyzed task description information.

In the embodiment, the distribution unit 503 may pre-establish at least one to-be-processed task queue, and then arrange the to-be-processed task determined by the analysis unit 502 into the to-be-processed task queue.

In the embodiment, the processing unit 504 may process a plurality of the to-be-processed tasks in the to-be-processed task queue based on the type (for example, a concurrent task queue or a serial task queue) of the to-be-processed task queue and the attributes (for example, generation time or priority) of the to-be-processed tasks in the to-be-processed task queue.

In some optional implementations of the embodiment, the to-be-processed task queue is a concurrent task queue, and the processing a plurality of the to-be-processed tasks in the to-be-processed task queue includes: adding, in response to the to-be-processed task queue being unempty and an idle thread existing in a first thread pool, at least a part of the to-be-processed tasks in the to-be-processed task queue to the first thread pool, wherein a number of the to-be-processed tasks in the at least a part of the to-be-processed tasks is less than or equal to a number of the idle threads in the first thread pool; and removing the at least a part of the to-be-processed tasks from the to-be-processed task queue after completing executing the at least a part of the to-be-processed tasks.

In some optional implementations of the embodiment, the to-be-processed task queue is a serial task queue, and the processing a plurality of the to-be-processed tasks in the to-be-processed task queue includes: using, in response to an absence of the to-be-processed tasks being executed and the serial task queue being unempty, the to-be-processed task at the head of the serial task queue as a first task, and executing following serial processing: executing the first task, and removing the first task from the serial task queue after completing the executing the first task; and using, in response to the serial task queue being unempty, the current to-be-processed task at the head of the serial task queue as the first task, and continuing executing the serial processing.

In some optional implementations of the embodiment, the service information is generated by the server based on event information received from the smart device, and the event information includes at least one of the following: voice input information of the smart device, or state change information of the smart device when executing the to-be-processed tasks.

In some optional implementations of the embodiment, the apparatus 500 further includes an event unit, configured for sending the event information to the server.

In some optional implementations of the embodiment, the event unit includes an event generation module, an event distribution module, and an uploading module. The event generation module is configured for generating a to-be-uploaded event based on the event information; the event distribution module is configured for arranging the to-be-uploaded event into a to-be-uploaded event queue; and the uploading module is configured for sending a plurality of the to-be-uploaded events in the to-be-uploaded event queue to the server in a predetermined data format.

In some optional implementations of the embodiment, the uploading module includes: an execution submodule, configured for adding, in response to the to-be-uploaded event queue being unempty and an idle thread existing in a second thread pool, at least a part of the to-be-uploaded events in the to-be-uploaded event queue to the second thread pool, wherein a number of the to-be-uploaded events in the at least a part of the to-be-uploaded events is less than or equal to a number of idle threads in the second thread pool; and a removal submodule, configured for removing the at least a part of the to-be-uploaded events from the to-be-uploaded event queue after completing executing the at least a part of the to-be-uploaded events.

In some optional implementations of the embodiment, a reusable communication link exists between the smart device and the server.

The apparatus for processing a task in a smart device provided by the embodiments of the disclosure arranges to-be-processed tasks into a to-be-processed task queue, thereby improving the processing efficiency of the to-be-processed tasks.

Figure 6:
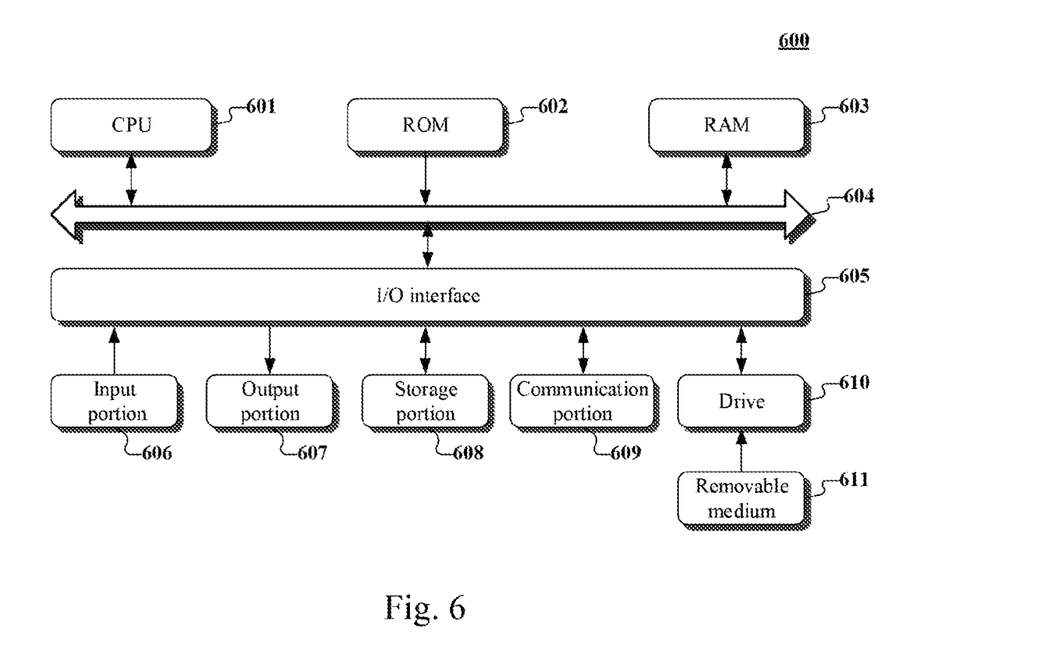
FIG. 6 is a structural schematic diagram of a computer system suitable for implementing a smart device according to an embodiment of the disclosure.

Referring to FIG. 6, a schematic structural diagram of a computer system 600 adapted to implement a smart device of the embodiments of the present application is shown. The smart device shown in FIG. 6 is merely an example and should not impose any restriction on the function and scope of use of the embodiments of the present application.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A drive 610 is also connected to the I/O interface 605 as required. A removable medium 611, such as a magnetic disk, an optical disk, a magneto-optical disk, and a semiconductor memory, may be installed on the drive 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of the present disclosure.

It should be noted that the computer readable medium in the present disclosure may be computer readable storage medium. An example of the computer readable storage medium may include, but not limited to: semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. The computer readable medium may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in the disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flowcharts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present application may be implemented by means of software or hardware. The described units or modules may also be provided in a processor, for example, described as: a processor, comprising a receiving unit, an analysis read unit, a distribution unit, and a processing unit, where the names of these units or modules do not in some cases constitute a limitation to such units or modules themselves. For example, the receiving unit may also be described as "a unit for receiving service information sent by a server."

In another aspect, the present application further provides a non-transitory computer-readable storage medium. The non-transitory computer-readable storage medium may be the non-transitory computer-readable storage medium included in the apparatus in the above described embodiments, or a stand-alone non-transitory computer-readable storage medium not assembled into the apparatus. The non-transitory computer-readable storage medium stores one or more programs. The one or more programs, when executed by a device, cause the device to: receive service information sent by a server, the service information comprising task description information in a predetermined data format; analyze the service information based on the predetermined data format to determine a to-be-processed task; arrange the to-be-processed task into a to-be-processed task queue; and process a plurality of the to-be-processed tasks in the to-be-processed task queue.

The above description only provides an explanation of the preferred embodiments of the present application and the technical principles used. It should be appreciated by those skilled in the art that the inventive scope of the present application is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present application are examples.

What is claimed is:

1. A method for processing a task in a smart device, comprising:
    transmitting, from the smart device to a server, event information including voice input obtained from the smart device, via sustained reusable communication link;
    receiving service information that has been generated by the server based on the event information, the service information comprising task description information in a predetermined data format and voice information in binary stream format;
    analyzing the service information based on the predetermined data format to obtain a task attribute and an attribute value;
    generating a to-be-processed task by encapsulating the obtained task attribute and attribute value;
    arranging the to-be-processed task into a to-be-processed task queue; and
    processing a plurality of to-be-processed tasks in the to-be-processed task queue based on a type of the to-be-processed task queue and attribute of the to-be-processed task, the type of the to-be-processed task queue being a concurrent task queue or a serial task queue,
    wherein the processing includes: (i) implementing a first thread pool having a predetermined number of threads for concurrently processing a plurality of the to-be-processed tasks in the to-be-processed task queue, and (ii) dynamically adjusting the number of the threads in the first thread pool based on the number of the to-be-processed tasks in the to-be-processed task queue and an idle duration of the threads.

2. The method according to claim 1, wherein the to-be-processed task queue is a concurrent task queue, and the processing a plurality of to-be-processed tasks in the to-be-processed task queue comprises:
    adding, in response to the to-be-processed task queue being unempty and an idle thread existing in a first thread pool, at least a part of the to-be-processed tasks in the to-be-processed task queue to the first thread pool, wherein a number of the to-be-processed tasks in the at least a part of the to-be-processed tasks is less than or equal to a number of the idle threads in the first thread pool; and
    removing the at least a part of the to-be-processed tasks from the to-be-processed task queue after completing executing the at least a part of the to-be-processed tasks.

3. The method according to claim 1, wherein the to-be-processed task queue is a serial task queue, and the processing a plurality of to-be-processed tasks in the to-be-processed task queue comprises:
    using, in response to an absence of the to-be-processed tasks being executed and the serial task queue being unempty, the to-be-processed task at a head of the serial task queue as a first task and executing following serial processing: executing the first task, and removing the first task from the serial task queue after completing the executing the first task; and
    using, in response to the serial task queue being unempty, the to-be-processed task at the head of the serial task queue as the first task, and continuing executing the serial processing.

4. The method according to claim 1, wherein the event information further comprises state change information regarding the change of the operation status of the smart device when executing the to-be-processed tasks.

5. The method according to claim 4, wherein the event information is sent to the server by following:
    generating a to-be-uploaded event based on the event information;
    arranging the to-be-uploaded event into a to-be-uploaded event queue; and
    sending a plurality of to-be-uploaded events in the to-be-uploaded event queue to the server in a predetermined data format.

6. The method according to claim 5, wherein the sending a plurality of to-be-uploaded events in the to-be-uploaded event queue to the server in the predetermined data format comprises:

adding, in response to the to-be-uploaded event queue being unempty and an idle thread existing in a second thread pool, at least a part of the to-be-uploaded events in the to-be-uploaded event queue to the second thread pool, wherein a number of the to-be-uploaded events in the at least a part of the to-be-uploaded events is less than or equal to a number of idle threads in the second thread pool; and removing the at least a part of the to-be-uploaded events from the to-be-uploaded event queue after completing executing the at least a part of the to-be-uploaded events.

7. An apparatus for processing a task in a smart device, comprising:

at least one processor; and a memory storing instructions, the instructions when executed by the at least one processor, cause the at least one processor to perform operations, the operations comprising:

transmitting, from the smart device to a server, event information including voice input obtained from the smart device, via sustained reusable communication link;

receiving service information that has been generated by the server based on the event information, the service information comprising task description information in a predetermined data format and voice information in binary stream format;

analyzing the service information based on the predetermined data format to obtain a task attribute and an attribute value;

generating a to-be-processed task by encapsulating the obtained task attribute and attribute value;

arranging the to-be-processed task into a to-be-processed task queue; and processing a plurality of to-be-processed tasks in the to-be-processed task queue based on a type of the to-be-processed task queue and attribute of the to-be-processed task, the type of the to-be-processed task queue being a concurrent task queue or a serial task queue, wherein the processing includes: (i) implementing a first thread pool having a predetermined number of threads for concurrently processing a plurality of the to-be-processed tasks in the to-be-processed task queue, and (ii) dynamically adjusting the number of the threads in the first thread pool based on the number of the to-be-processed tasks in the to-be-processed task queue and an idle duration of the threads.

8. The apparatus according to claim 7, wherein the to-be-processed task queue is a concurrent task queue, and the processing a plurality of to-be-processed tasks in the to-be-processed task queue comprises:

adding, in response to the to-be-processed task queue being unempty and an idle thread existing in a first thread pool, at least a part of the to-be-processed tasks in the to-be-processed task queue to the first thread pool, wherein a number of the to-be-processed tasks in the at least a part of the to-be-processed tasks is less than or equal to a number of the idle threads in the first thread pool; and removing the at least a part of the to-be-processed tasks from the to-be-processed task queue after completing executing the at least a part of the to-be-processed tasks.

9. The apparatus according to claim 7, wherein the to-be-processed task queue is a serial task queue, and the processing a plurality of to-be-processed tasks in the to-be-processed task queue comprises:

using, in response to an absence of the to-be-processed tasks being executed and the serial task queue being unempty, the to-be-processed task at a head of the serial task queue as a first task and executing following serial processing: executing the first task, and removing the first task from the serial task queue after completing the executing the first task; and using, in response to the serial task queue being unempty, the to-be-processed task at the head of the serial task queue as the first task, and continuing executing the serial processing.

10. The apparatus according to claim 7, wherein the event information further comprises state change information regarding the change of the operation status of the smart device when executing the to-be-processed tasks.

11. The apparatus according to claim 10, wherein the event information is sent to the server by following:

generating a to-be-uploaded event based on the event information;

arranging the to-be-uploaded event into a to-be-uploaded event queue; and sending a plurality of to-be-uploaded events in the to-be-uploaded event queue to the server in a predetermined data format.

12. The apparatus according to claim 11, wherein the sending a plurality of to-be-uploaded events in the to-be-uploaded event queue to the server in the predetermined data format comprises:

adding, in response to the to-be-uploaded event queue being unempty and an idle thread existing in a second thread pool, at least a part of the to-be-uploaded events in the to-be-uploaded event queue to the second thread pool, wherein a number of the to-be-uploaded events in the at least a part of the to-be-uploaded events is less than or equal to a number of idle threads in the second thread pool; and removing the at least a part of the to-be-uploaded events from the to-be-uploaded event queue after completing executing the at least a part of the to-be-uploaded events.

13. A smart device, comprising:

one or more processors; and a memory, for storing one or more programs, wherein the one or more programs enable, when executed by the one or more processors, the one or more processors to implement operations, the operations comprising:

transmitting, from the smart device to a server, event information including voice input obtained from the smart device, via sustained reusable communication link;

receiving service information that has been generated by the server based on the event information, the service information comprising task description information in a predetermined data format and voice information in binary stream format;

analyzing the service information based on the predetermined data format to obtain a task attribute and an attribute value;

generating a to-be-processed task by encapsulating the obtained task attribute and attribute value;

arranging the to-be-processed task into a to-be-processed task queue; and processing a plurality of to-be-processed tasks in the to-be-processed task queue based on a type of the to-be-processed task queue and attribute of the to-be-processed task, the type of the to-be-processed task queue being a concurrent task queue or a serial task queue, wherein the processing includes: (i) implementing a first thread pool having a predetermined number of threads for concurrently processing a plurality of the to-be-processed tasks in the to-be-processed task queue, and (ii) dynamically adjusting the number of the threads in the first thread pool based on the number of the to-be-processed tasks in the to-be-processed task queue and an idle duration of the threads.

14. A non-transitory computer-readable storage medium storing a computer program, the computer program when executed by one or more processors, causes the one or more processors to perform the method according to claim 1.

* * * * *